United States Patent Office 3,119,782
Patented Jan. 28, 1964

3,119,782
REACTION PRODUCT OF A POLYALKYLENE POLYSULFIDE AND A POLYFUNCTIONAL AZIRIDINE RING-CONTAINING COMPOUND
Paul Fram, Lincoln Township, Washington County, Minn., assignor to Minnesota Mining and Manufacturing Company, St. Paul, Minn., a corporation of Delaware
No Drawing. Filed Nov. 1, 1960, Ser. No. 66,402
20 Claims. (Cl. 260—42)

This invention relates to polymeric compositions and more particularly to copolymers of polyalkylene polysulfide prepolymers with certain polyfunctional aziridine rings containing monomers.

This application is continuation-in-part of my prior copending application Serial Number 709,471, filed January 17, 1958, now abandoned.

Heretofore, in order to form room temperature-curing polysulfide rubber systems, it has been the practice to mix a polyalkylene polysulfide prepolymer with metallic oxide accelerator such as of lead dioxide, zinc oxide or the like. Although such systems are widely used, they have several inherent disadvantages. Thus, for example, because the lead dioxide catalyst is a solid having a specific gravity more than seven times that of the polyalkylene polysulfide prepolymers, it has been difficult in many applications to get sufficient mixing between the prepolymer and the accelerator to avoid unevenness in speed and quality of cure and consequently of the resulting rubber. In addition, the resulting cured rubbers have been dark colored and opaque, which is a disadvantage in the production of white or light-colored objects. Other conventional curing agents for polyalkylene polysulfide prepolymers are more easily blended into the said prepolymers (e.g. p-quinondioxime and diphenylguanidine), but such systems require an extended heat cycle to cure and are thus not useful in applications in which room temperature curing is required. Furthermore, only negligible adhesion is developed to common materials of construction, such as metals and glass, when either of the above-described curing systems is used. Consequently, it has been necessary to alter the basic properties of these systems to improve their adhesive characteristics by relatively expensive and difficult techniques of compounding and to improve their adhesion by developing primers for specific surfaces.

It is an object of the present invention to produce dense, tough, often transparent or translucent and light-colored resinous or elastomeric solid copolymers of polyalkylene polysulfide prepolymers with certain polyfunctional aziridine ring containing monomers, which copolymers adhere strongly to common materials of construction such as glass and metals without primers and which cure at relatively low temperatures. Another object of the invention is to provide relatively stable liquid mixtures of polyalkylene polysulfide prepolymers with certain polyfunctional aziridine ring-containing monomers (also sometimes referred to herein as polyfunctional alkylenimine derivatives) which blend easily and uniformly with liquid curing agents and cure smoothly at low temperatures to produce elastomers having superior heat stability and solvent resistance together with good resistance to high humidity. Still another object of the invention is to provide rubber-like polymers having improved color, compatibility and working properties. Further objects of the invention will be apparent from the disclosure hereinafter made.

In accordance with the above and other objects of the invention it has been found that when polyalkylene polysulfide prepolymers are copolymerized with polyfunctional alkylenimine derivatives, resinous or elastomeric compositions are produced which have highly advantageous properties.

The compositions of the invention have a high degree of heat stability while retaining desirable mechanical and chemical properties at high temperature. They have excellent solvent resistance as well as resistance to water and high humidity and, in addition, adhere readily to a wide variety of surfaces such as glass and metals when copolymerized in contact with said surfaces. They are often colorless and transparent or of such a light color that they can be used in the production of white or light-colored resinous or elastomeric products. They can be mixed and compounded in simple, open mixing equipment rather than closed containers and ball mills; and they may be cast in inexpensive open molds, rather than high pressure and/or high temperature molds. When thus cast, they can be cured at surprisingly low temperatures, often at room temperature and when so cured, they are remarkably free from gas formation; yet they have useful pot lives in spite of their low temperature curing properties. The systems are characterized further by ordinarily requiring no solvents, so that they can be prepared as mixtures containing 100% solid-forming components. The low temperature curing properties of the compositions of the invention enlarge their area of utility greatly, e.g. in applications (as in encapsulation) in which parts to be covered with resin are so fragile or of such materials that they are destroyed by heat, and in applications in which it is difficult or undesirable to heat the resin and parts to be coated until sufficiently intimate contact between resin and parts is obtained. The solventless liquid systems of the invention cure with substantially no volume change to yield solids which closely conform to the mold or container, and are easily bonded to metals and glass. Thus the compositions have utility as sealants and may be used to seal solvent storage tanks and to weather-proof joints between metal and glass parts in building construction.

Regarding the term "polyalkylene polysulfide prepolymers" as used herein, reference is made to those polymers described, for example, in U.S. Patents No. 1,890,191, 2,049,974, 2,100,351, 2,216,044, 2,466,963, 2,474,859, and 2,910,922 and in a publication by Jorczak et al. of Thiokol Corporation, Trenton, New Jersey, in an article published in Industrial and Engineering Chemistry, vol. 43, page 324, February 1951, which illustrate the type of prepolymer useful for the purposes of the invention. The various polyalkylene polysulfide prepolymers useful in the present invention are polyfunctional in terms of mercaptan groups and contain recurring disulfide linkages (—S—S—). They are produced in the form of liquids, solids and dispersions and are sometimes referred to as "polyfunctional liquid mercaptans" (when in liquid form). Difunctional polyalkylene polysulfide prepolymers which can be used in preparing the compositions of the present invention are those having the formula:

where $z$ is an integer from 3 to 100 or more and $R'''$ is a radical of the type disclosed in the said publication by Jorczak et al. Usually the radical $R'''$ can be represented by the formula:

Polyalkylene polysulfide prepolymers having the above-mentioned formula are available with varying functionality and all are suitable in the preparation of the compounds of the present invention.

Although the invention can be used with any of the polyalkylene polysulfide prepolymers, whether in liquid or solid form, particular attention will be drawn, for purposes of illustration, to the uses of the invention with the liquid polymers.

Commercially important polyalkylene polysulfide prepolymers (some of which are distributed under the registered trademark "Thiokol," as hereinafter noted) are derived from various polyfunctional organic halides and frequently from mixtures of such halides, reacted with an alkali metal polysulfide and thereafter treated in a particular manner as described in the earlier patents, cited above, and others.

The polyalkylene polysulfide prepolymers which may be utilized in the present invention may exist in the form of thin, syrupy liquids to thick, viscous liquids to solids. Their molecular weights may vary from about 200 to about 30,000 or higher. Normally liquid polymers are preferred for use in the present invention, such liquid polymers having an average molecular weight of from about 500 to 20,000 or higher, as determined in the familiar manner by means of end group titration. Liquid polymers in this range are viscous liquids at ordinary temperatures, have the consistency of thin syrup or molasses, and a viscosity of between about 3 and 1,500 poises. The degree of copolymerization employed in the manufacture of the polyalkylene polysulfide prepolymer and the average molecular weight thereof influences the physical properties. Generally, the use of a liquid polyalkylene polysulfide prepolymer having a lower average molecular weight (say below 3,000) tends to produce harder bodies than a liquid polymer having a higher average molecular weight, the latter tending to produce bodies having a lower Shore hardness but better tear resistance. These tendencies are of course particularly strong in copolymers of the invention in which a relatively large amount of the polyalkylene polysulfide prepolymer is used with respect to the polyfunctional ethylenimine.

The polyfunctional alkylenimine derivatives which are employed in this invention are alkylenimine derivatives of the formula:

where Q is an $n$ valent radical, $n$ is 2 or more (preferably 2 or 3), N is linked to an atom having a valence of 4 or 5, and R' and R'' are hydrogen or an alkyl group containing not more than 8 carbon atoms and preferably containing from 1 to 4 carbon atoms. Q may be an aliphatic, aromatic or alicyclic organic radical which does not contain an active hydrogen but which may contain atoms other than carbon, such as oxygen, sulfur, etc. This includes, for example, compounds in which Q is —SO₂R''''SO₂—, wherein R'''' is a divalent organic linking group which contains no active hydrogen, preferably a divalent aliphatic, aromatic or alicyclic radical (such as N,N'-bis-2-methylethylene-1,3-benzene disulfonamide; N,N' - bis - 1,2 - ethylene - 1,3 - butanedisulfonamide; N,N' - bis - 1,2 - ethylene - 1,4 - butanedisulfonamide and N,N' - bis - 1,2 - ethylene- 1,3 - propanedisulfonamide) and compounds in which Q is a trivalent organic radical (such as N,N', N'''-trisethylenetrimesamide; N,N',N''-tris-2 - methylethylenetrimesamide; N,N,'N'' - tris - 2 - butylethylenetrimesamide; N,N',N'' - tris - 2,2 - dimethylethylenetrimesamide, etc. The N,N',N''-tris-alkentrimesamides and their preparation are described in U.S. Serial No. 823,152, filed August 7, 1959). Q may also be

wherein Y is either oxygen or —NH—, $x$ is either 0 or 1, and R is a divalent organic linking group (preferably a divalent aliphatic, aromatic or alicyclic radical) which may contain atoms other than carbon, e.g. oxygen, sulfur, etc., but does not contain any active hydrogen atoms, i.e. hydrogen which is active to the Zerewitinoff test (inert to Grignard reagents).

In still another group of alkylenimine derivatives which are employed in this invention, Q may contain a

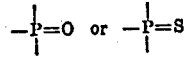

radical, such as those compounds in which Q is

wherein $R^v$ is a monovalent or divalent organic linking group (preferably aliphatic, aromatic or alicyclic) which may contain atoms other than carbon, e.g. oxygen, sulfur, etc., but does not contain any active hydrogen atoms, i.e. hydrogen which is active to the Zerewitinoff test (inert to Grignard reagents).

The phosphorus-containing alkylenimine derivatives include for example, N,N',N''-tris-ethylenephosphoric triamide; N,N',N'' - tris - ethylenethiophosphoramide; N,N-diethyl - N',N'' - diethylenethiophosphoramide; N,N' - diethylenebenzene thiophosphorodiamide; N - (3 - oxapentamethylene)-N',N''-diethylene phosphoric triamide; N,N'-diethylene benzene phosphondiamide; N,N'-diethylene ethane phosphondiamide; butyl N,N'-diethylenephosphorodiamidate; butyl - N,N' - di - 2 - methylethylenephosphorodiamidate; hexyl-N,N'-diethylene phosphorodiamide; N,N' - dioctyl - N',N'' - diethylenephosphoric triamide; N,N',N'' - tris(1,1 - dimethylethylene)phosphoric triamide; N,N' - dibutyl - N',N'' - diethylene phosphoric triamide; parachlorophenyl - N,N' - di - 2 - methylethylene phosphoric diamide; etc.

The carboxyl containing curing agents which are particularly preferred have the formula:

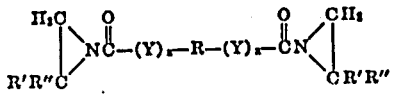

wherein Y, $x$, R, R' and R'' are as previously defined. When $x$ is 0, the compound is a bis-1,2-alkylenamide. When Y is oxygen and $x$ is 1, the compound is a bis-1,2-alkylene carbamate. When Y is —NH— and $x$ is 1, the compound is a bis-1,2-alkylene urea, such as 1,6-hexamethylene N,N'-diethylene urea and toluylene-N,N'-diethylene urea.

Bis-1,2-alkylene carbamates and their preparation are described in U.S. Serial No. 850,541, filed November 3, 1959. Generally, their preparation involves the reaction of a 1,2-alkylenimine in a water phase with a solution of a chlorocarbonate of a difunctional alcohol in a water immiscible organic solvent, in the presence of an acid acceptor, at a temperature between about —5° C. and 30° C. The following Example A illustrates the preparation.

EXAMPLE A

A 250 ml. three necked flask was equipped with a stirrer, thermometer, condenser and dropping funnel. To the flask was added a solution of 41.5 g. (0.3 M) of potassium carbonate in 50 ml. of water, followed by 9.0 g. (0.21 M) of ethylenimine. This mixture was stirred and cooled to 10° C. A solution composed of 27.5 g. (0.1 M) of triethylene glycol bis chlorocarbonate in 100 ml. of benzene was then added dropwise to the flask with stirring and cooling over a period of about 18 minutes. The mixture was kept at 10–12° C. during the addition and was allowed to warm to room temperature after the addition had been completed. Stirring was continued for an additional hour. The benzene layer was recovered, dried over molecular sieve, filtered and evaporated to constant weight under vacuum. 28 g. of a water-white liquid product (which was identified as N,N'-bis-1,2-ethylene (triethylene glycol) carbamate) were obtained, corresponding to a 99% yield thereof. The refractive index ($n_D^{25}$) of this product was 1.4748 and its density ($d_4^{22°}$) was 1.198. Upon analysis, this product was found to contain 9.74% of nitrogen and 0.1% chlorine as compared to calculated values of 9.73% and 0.0% respectively. It was also soluble in a 1:1 weight ratio with water, methanol, isopropanol, methyl ethyl ketone, ethyl cellosolve, butyl acetate and toluene.

Illustrative of the bis-carbamates which are useful as curing agents in the present invention are:

N,N'-bis-1,2-ethylene (1,4-butanediol) carbamate;
N,N'-bis-1,2-propylene (1,4-butanediol) carbamate;
N,N'-bis-1,2-butylene (1,4-butenediol) carbamate;
N,N'-bis-1,2-ethylene (diethylene glycol) carbamate;
N,N'-bis-1,2-butylene (diethylene glycol) carbamate;
N,N'-bis-1,2-ethylene (triethylene glycol) carbamate;
N,N'-bis-1,2-propylene (triethylene glycol) carbamate;
N,N'-bis-1,2-butylene (triethylene glycol) carbamate;
N,N'-bis-1,2-ethylene (polyethylene glycol-200) carbamate;
N,N'-bis-1,2-ethylene (polyethylene glycol-400) carbamate;
N,N'-bis-1,2-ethylene (polyethylene glycol-1000) carbamate;
N,N'-bis-1,2-propylene (polyethylene glycol-1000) carbamate;
N,N'-bis-1,2-ethylene (polyethylene glycol-4000) carbamate;
N,N'-bis-1,2-ethylene (polypropylene glycol-1025) carbamate;
N,N'-bis-1,2-ethylene (polybutylene glycol-500) carbamate;
N,N'-bis-1,2-ethylene [1,1'-isopropylidenebis (p-cyclohexanol)] carbamate;
N,N'-bis-1,2-ethylene[1,1'-isopropylidenebis (p-phenyleneoxy) di-2-propanol] carbamate;
N,N'-bis-1,2-ethylene phenylenoxydiacetamide;
N,N'-bis-1,2-ethylene phenylenoxy carbamate;
N,N'-bis-1,2-ethylene-4,4-bisphenyl carbamate;
N,N'-bis-1,2-ethylene (1,1'-isopropylidene-bis-phenylene) carbamate;
N,N'-bis-ethylene-resorcinol carbamate,
N,N'-biethylene bisphenol-A-carbamate, etc.

The preferred aromatic carbamates are represented by the above formula wherein R is 1,3-phenylene, 1,4-phenylene, 1,1'-isopropylidene-bis-phenylene, or 1,1'-isopropylidene bis (p-phenyleneoxy) di-2-propanol. The preferred aliphatic carbamates are represented by the above formula wherein R is a branched or straight chain alkylene radical having from about 4 to about 40, preferably from about 4 to about 20, carbon atoms.

Bis-1,2-alkylenamides and their preparation are described in U.S. Serial No. 832,152 (filed August 7, 1959), Serial No. 840,255 (filed September 16, 1959) and Serial No. 850,330 (filed November 2, 1959). Generally, their preparation involves the reaction of an alkylenimine in an aqueous phase with a solution of a dicarboxylic acid halide in a water immiscible organic solvent in the presence of an acid acceptor at a temperature between about −5 C. and 30° C. Illustrative of the N,N'-bis-1,2-alkylenamides in accordance with this invention are N,N'-bis-1,2-ethylenadipamide;
N,N'-bis-ethylenpentadecyladipamide;
N,N'-bis-1,2-butylenadipamide;
N,N'-bis-1,2-ethylenepimelamide;
N,N'-bis-ethylene thiodipropionamide;
N,N'-bis-ethylene oxydipropionamide;
N,N'-bis-1,2-ethylenisosebacamide;
N,N'-bis-1,2-butylenisosebacamide;
N,N'-bis-1,2-butylenisosebacamide;
N,N'-bis-1,2-ethylensebacamide;
N,N'-bis-1,2-ethylensuberamide;
N,N'-bis-1,2-propylensuberamide;
N,N'-bis-1,2-butylensuberamide;
N,N'-bis-1,2-ethylenazelaamide;
N,N'-bis-1,2-propylenazelaamide;
N,N'-bis-1,2-butylenazelaamide;
N,N'-bis-1,2-ethylendodecanoyldicarboxylic acid amide;
N,N'-bis-1,2-ethylentetradecanoyldicarboxylic acid amide;
N,N'-bis-1,2-propylentetradecanoyldicarboxylic acid amide;
N,N'-bis-1,2-ethylenhexadecanoyldicarboxylic acid amide;
N,N'-bis-1,2-ethylenoctadecanoyldicarboxylic acid amide;
N,N'-bis-1,2-propylenoctadecanoyldicarboxylic acid amide;
N,N'-bis-1,2-propylendodecanoyldicarboxylic acid amide;
N,N'-bis-1,2-pentylensebacamide;
N,N'-bis-1,2-ethylene monadecanediamide;
N,N'-bis-1,2-ethylene-1,4-naphthalenedicarboxamide;
N,N'-bis-1,2-propylene-1,4-naphthalenedicarboxamide;
N,N'-bis-1,2-ethylene-4,4'-bisphenyl dicarboxamide;
N,N'-bis-1,2-propylene-4,4-biphenyl dicarboxamide;
N,N'-bis-1,2-ethylene hexahydroterephthalamide;
para-(N-1,2-ethylene carboxamidophenyl)-N-1,2-ethylene acetamide;
N,N'-bis-1,2-ethylene isophthalamide;
N,N'-bis-1,1-dimethylethylene isophthalamide;
N,N'-bis-1,2-butylene isophthalamide;
N,N'-bis-1,2-octylenisophthalamide;
N,N'-bis-1,2-ethylene hexahydroisophthalamide; etc.

The preferred aliphatic bis-1,2-alkylenamides are represented by the above formula wherein R is a branched or straight chain alkylene radical having from about 4 to about 40, preferably from about 4 to about 20, carbon atoms. The preferred aromatic bis-1,2-alkylenamides are represented by the above formula wherein R is 1,3-phenylene, 1,4-phenylene, 1,4-napthalene, or 4,4'-bisphenyl. The following Example B illustrates the preparation.

EXAMPLE B

N,N'-bis-ethylene isosebacamide is prepared by the reaction of ethyleneimine with isosebacoyl dichloride to produce the desired substantially pure monomer, with hydrogen chloride as a by-product. Specifically, it may be prepared as follows: A solution of about 95.6 parts of isosebacoyl dichloride prepared from isosebacic acid dissolved in 400 parts of diethyl ether is added dropwise with cooling and vigorous stirring to a flask containing a solution of 110 parts of potassium carbonate and 43 parts of ethylenimine in 800 parts of water. The temperature of the mixture is maintained below 15° C. and the acid chloride is added at a rate of approximately 1 part per minute. The reaction mixture is allowed to warm gradually to room temperature, while stirring, for an additional hour. During the total reaction period, the pH of the reaction mixture has dropped from approximately 12.5 at the beginning of the reaction to about 8.6 at the end. The ether layer is separated, dried over solid anhydrous sodium hydroxide at 0° C. for 1 hour, the sodium hydroxide is removed by filtration and the ether removed from the filtrate under reduced pressure. The resulting reaction product, N,N'-bis-1,2-ethylenisosebacamide, remains as a water-white liquid.

The mechanism by which reaction between the polyalkylene polysulfide prepolymers and the polyfunctional alkylenimine derivatives react is not fully understood. A possible mechanism for this reaction may be illustrated as follows:

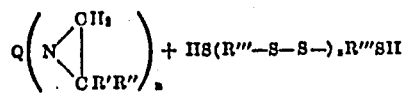

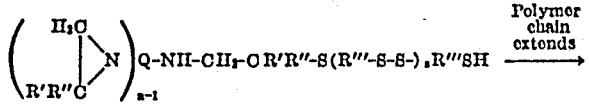

wherein Q, R', R'', R''', n and z are as previously defined. Regardless of the validity of this theory, which does not in any way limit the scope of the invention, these two constituents do react to form addition polymers.

The polyalkylene polysulfide prepolymers and the polyfunctional alkyleneimine derivative are both capable of homopolymerization in the presence of suitable curing agents to solid resinous or elastomeric compositions. In the case of the polyalkylene polysulfide prepolymers these curing agents may be polyfunctional amines, sodium, potassium and ammonium chromates and bichromates, etc. In the case of the polyfunctional alkylenimine derivatives, weak or strong acids and bases act as curing agents. Among the acids are the heavy metal chlorides, such as zinc or lead chlorides, the mineral acids, such as hydrochloric, sulfuric or phosphoric acids, sulfonic acids, such as p-toluenesulfonic acid, and other acids. Another catalyst which is effective is the boron-trifluoride molecular addition product with monoethylamine. Among the bases are sodium methoxide and amines such as ethylene diamine or monoethanolamine. In the presence of a suitable curing agent, substantially all proportions of the polyalkylene polysulfide prepolymers and the polyfunctional alkylenimine derivatives may be copolymerized. In mixtures containing a great preponderance of one or the other constituent, therefore, it is possible to achieve simultaneously polymerization among units of the major constituent itself and between units of the major and minor constituents. The final cured polymer molecules will thus include the residues of units of both constituents in the relative amounts in which they were originally added. It should be noted that by adding only an extremely small amount of the minor constituent it is possible to approach the composition, and hence the properties, of the homopolymer of the major constituent as closely as is desired. Therefore, in order to realize the novel properties of the copolymers of the present invention it is necessary to add at least a significant amount of the minor constituent. An amount of about 5% or more yields a signficant change in properties.

If desired, fillers can be added to the composition before curing, as well as dyes or other substances which may be considered as adjuvants and the like; for example, accelerators, antioxidants, and catalysts. The finer fillers are good reinforcing agents for these systems, neutral fillers such as calcium carbonate, iron oxide and titanium dioxide being preferred. Acidic fillers such as certain carbon blacks and silicas can also be used under certain circumstances. The rubbery copolymers of the invention can generally be compounded with any of the usual compounding agents, as well as with the usual antioxidants, accelerators, deodorizing agents, reinforcing agents, softeners, etc. The addition of and increase in amounts of fillers, pigments and reinforcing agents will in general increase the hardness, toughness and tensile strength of the elastomeric polymers.

The adhesiveness of compositions of the invention which are cured in contact with metals, glass, resin-coated objects, etc. may be increased without destruction of other properties by the addition of various resinous or plastic compositions. These other polymers are generally added in the ratio of from about 1 to about 15 to 20 parts per 100 parts of the copolymer of the present invention although as high as 30 or even 50 parts can be used. When used in the lower range of proportions the cured compounds tend to be resilient and even slightly softer than the copolymers; when used at a ratio of 30 parts or more, the cured compounds may be harder and more brittle. Primarily due to their outstanding properties of resistance to heat, water and to chemicals, the phenolic and epoxy resins are preferred for this purpose for use with the compositions of the invention. In this regard, the term "phenolic resins" is intended to include the resinous products obtained from the condensation of almost any phenolic body with an aldehyde such as formaldehyde or furfural. Likewise by "epoxy resins" is meant any epoxy reaction product for example the product obtained by reacting a polyhydroxy compound and epichlorohydrin. The cured composition resulting from the conjoint use of fillers, pigments, modifiers and resinous components with the copolymers of the invention may contain as low as 40% by weight of such copolymers. Other resinous or plastic compositions which may be added to the copolymers of the invention are alkyd resins, soluble vinyl polymers and copolymers, chlorinated rubbers, cellulose esters, cellulose ethers, acrylic acid ester polymers, vinylidine polymers and copolymers, rubber hydrochloride, chlorinated diphenyls, urea formaldehyde polymers, toluenesulfonamide-formaldehyde reaction products, coumarone-indene polymers, styrene polymers and copolymers, etc.

In the preparation of the cured compositions of the invention, both the polyalkylene polysulfide prepolymers and the polyfunctional alkylenimine derivatives may be employed in either liquid or solid form, which are mixed to produce curable compositions. Thus mixing can ordinarily be easily accomplished either when both constituents are liquid or when the polyalkylene polysulfide prepolymer is liquid and the polyfunctional alkylenimine derivative is a solid. Likewise the mixing can be relatively easily accomplished when the polyalkylene polysulfide prepolymer is a solid and the polyfunctional alkylenimine derivative is a liquid although the use of a rubber mill may be necessary. In cases in which both constituents are solids no particular mixing difficulties are usually encountered although the use of rubber milling equipment is almost always necessary. Other aids to mixing are solvents which may be removed as by evaporation upon completion of the mixing and the application of a moderate degree of heat to lower the viscosity of the liquid constituents and to liquify solid constituents.

The liquid compositions of the present invention are particularly well suited for use as sealants because the polymers produced therefrom have good resistance to chemicals, solvents and aromatic oils, as well as a high degree of dimensional stability on curing, ease of compounding and easily controlled curing rate. To improve their characteristics as sealants they may be compounded, if desired, with pigments, fillers, reinforcing agents, antioxidants, accelerators, deodorizing agents, softeners, etc. These uncured systems with curing agent added may be introduced into joints or spaces which are to be sealed, using the ordinary means available to the art, such as caulking guns and the like. The compositions undergo spontaneous curing, producing solid products which provide effective sealing means. Alternatively it will be obvious that metal sheets or the like which are to be sealed can be coated with the liquid compositions along the lines of juncture, for example, on the abutting portions of lap joints, and then riveted, crimped together or otherwise joined, whereupon the elastomer produced on curing will seal the joints. Likewise, by employing materials of low viscosity or by employing solvents to reduce viscosity, the composition in which curing has been initiated can be utilized to coat surfaces, for example, interior surfaces of fuel tanks and the like, to seal the joints thereof and at the same time provide a substantially fuel-proof lining therefor.

In order more clearly to disclose the nature of the present invention, a number of specific products and compositions in accordance with the invention will now be described. It should be understood, however, that this is done solely by way of illustration and is intended neither to delineate the scope of the invention nor to limit the ambit of the appended claims.

*Example 1*

Several rubbery materials are prepared for the purpose of comparing the properties of unfilled copolymers of a polyalkylene polysulfide prepolymer and the bis-amides with a conventional homopolymer of the same polyalkylene polysulfide prepolymer. The polyalkylene polysulfide prepolymer used in these mixtures is a thiol-terminated liquid polymer of bis (ethylene oxy)methane having a viscosity at 25° C. of 350–450 poises, a number average molecular weight of 4,000 and a pour point of 35° F. (which is available from the Thiokol Corporation of Trenton, N.J., under the designation "Thiokol" liquid polymer LP-2).

The copolymers are prepared by mixing the polyalkylene polysulfide prepolymer and the bis-amide before adding the tri(dimethyl aminomethyl) phenol catalyst. The homopolymer is prepared by mixing the catalyst (lead dioxide), the plasticizer (dibutyl phthalate) and the moderator (stearic acid) before adding the polyalkylene polysulfide prepolymer. The compositions and cures of the various lots are given in the following table.

| | Lots | | | | |
|---|---|---|---|---|---|
| | 1a | 1b | 1c | 1d | 1e |
| Compositions (parts by weight): | | | | | |
| Polyalkylene polysulfide prepolymer ("Thiokol" liquid polymer LP-2) | 100 | 100 | 100 | 100 | 100 |
| N,N'-bis-ethylenisosebacamide | 9.6 | 9.6 | | | |
| N,N'-bis-ethylenisophthalamide | | | 9 | 9 | |
| Tri (dimethyl aminomethyl) phenol [1] | 1.1 | 1.1 | 1.1 | 1.1 | |
| Lead dioxide | | | | | 7.5 |
| Dibutylphthalate | | | | | 6.7 |
| Stearic acid | | | | | .8 |
| Cures: | | | | | |
| Ambient temperatures only (i.e. 70–75° F.) | X | | X | | |
| 2½ hr. at 100° F. | | X | | X | X |

[1] Available from the Rohm and Haas Co. of Philadelphia, Pennsylvania under the designation DMP-30.
Appearance: Lots 1a and 1c are straw-colored and translucent, lots 1b and 1d are red and translucent and lot 1e is reddish-brown and opaque.

The results of the tests performed on these rubbers are as follows:

| | Lots | | | | |
|---|---|---|---|---|---|
| | 1a | 1b | 1c | 1d | 1e |
| Tensile Properties: [1] | | | | | |
| Tensile strength, p.s.i. | 84 | 63 | 75 | 81 | 73 |
| Elongation, percent | 103 | 90 | 67 | 113 | 103 |
| Set at break, percent | 0 | 0 | 0 | 0 | 0 |
| Hardness: Shore A-2 (ASTM D 676-49T) | 30 to 35 | 25 to 30 | 35 to 40 | 30 to 35 | 30 to 35 |
| Low temperature flexibility: | | | | | |
| Gehman T₁₀, ° C. (ASTM D 1053-52T) | –48 | –43 | –52 | –42 | –51 |
| Scott Brittleness, T₅, ° C. (ASTM D 764-52T) | –45 to –48 | –46 to –50 | –35 to –38 | –41 to –43 | –45 to –50 |
| Volume swelling in water (ASTM D 471-49T "B"): Immersed 70 hr. at 180° F., percent | 65 | 41 | 23 | 11 | 15.4 |
| Volume swelling in 70:30 isooctane: toluene fuel, calculated according to the formula: [2] Immersed 48 hr. at 180° F., percent | 25 | | 22 | 23 | 62 |

[1] Tensile properties tests are run on dumbbell specimens (0.5" between bench marks) at jaw separation rate of 2"/minute. Test values correlate with those from ASTM D 412-51T.

[2] $100 \frac{D_1}{D_2}\left(\frac{B-1}{C}\right)$ = Volume swelling, percent, wherein $D_1$ is the density of the sample before immersion, $D_2$ is the density of the fuel (i.e. 0.74 grams per cc. 25° C./4° C.), B is the weight of the sample at the end of the time of immersion before removal of any retained fuel and C is the weight of the sample after immersion and after removal of any retained fuel.

| | Lots | | |
|---|---|---|---|
| | 1a | 1c | 1e |
| Adhesion Properties: [1] | | | |
| To glass | 3.5C | 6C | [2] 2A |
| To aluminum | 4C | 6C | 2A |
| To stainless steel | 3C | 6C | 2A |
| Resistance to aging at high temperature (High temperature aging 70 hr. at 250° F. in air): | | | |
| Weight loss during aging, percent | 10.19 | 7.52 | |
| Hardness, Shore A-2: | | | |
| Before aging | 40–45 | 40–45 | |
| After aging | 40–45 | 40–45 | |

[1] The test procedures of MIL-S-8802 (ASG) are used. The type of failure is designated as either adhesive (A) or cohesive (C).
[2] The test value 2 is the lowest figure measurable on the equipment used.
In addition, lot 1e adheres so strongly to aluminum even after immersion in either JP-4 fuel or in a 3% solution of sodium chloride in water for 1 week at 140° F., that it fails cohesively before it is pulled away from the aluminum.

Lots 1a, 1b, 1c, and 1d are useful for sealing the seams of metal tanks.

Three additional rubbers are prepared utilizing the process of mixing of similar lots in the series 1a through 1e except that a solvent is added:

| | Lots | | |
|---|---|---|---|
| | 1f | 1g | 1h |
| Compositions: | | | |
| Polyalkylene polysulfide prepolymer ("Thiokol" liquid polymer LP-2) | 134.5 | 150.0 | 125.0 |
| N,N'-bis-ethylenisophthalamide | 11.0 | | |
| N,N'-bis-ethylensebacamide | | 14.3 | |
| Triethyl amine | 1.2 | 1.5 | |
| Lead dioxide | | | 11.2 |
| Stearic acid | | | 1.34 |
| Xylol | 10.00 | 14.0 | 7.45 |

These rubbers are subjected to adhesion and weight loss tests as follows:

| | Lots | | |
|---|---|---|---|
| | 1f | 1g | 1h |
| Adhesion to aluminum: [1] | | | |
| Original | 2.9 | 2.2 | 0.4 |
| After 48 hours' immersion in 70:30 isooctane:toluene | 2.5 | 2.0 | 0.3 |
| Percent adhesion loss in fuel | 13.8 | 9.1 | 25 |
| Weight loss: Percent weight loss after 25 days' immersion in Type 3 Fuel | 15.0 | | 21.1 |

[1] The test procedures of MIL 7502A are used.

The properties of the copolymers of the invention are often improved by the addition of other resins and fillers. This is illustrated by lot 1j.

Composition: Lot 1j
Polyalkylene polysulfide prepolymer ("Thiokol" liquid polymer-LP-2) _____ 50
N,N'-bis-ethylenisosebacamide _____ 50
Lead dioxide _____ 7.5
Dibutyl phthalate _____ 6.8
Stearic acid _____ 1.7
Carbon black filler _____ 30

Lot 1j is prepared by mixing the polyalkylene polysulfide prepolymer, the bis-amide and the carbon black and then adding the lead dioxide, the dibutyl phthalate and the stearic acid which have been mixed separately. It is a viscous mixture which is cured for 90 hours at 160° F. At the end of this cure a solid having a Shore A–2 hardness of 35–40 is obtained.

*Example 2*

A polyalkylene polysulfide prepolymer which is a thiol-terminated liquid polymer of bis(ethylene oxy)-methane having a viscosity of 25° C. of 7–12 poises, a number average molecular weight of 1,000 and a pour point of −15° F. (which is available from the Thiokol Corporation of Trenton, N.J., under the designation "Thiokol" liquid polymer LP-3) has been used in this example. Lots 2a through 2e are prepared by the methods of lots 1a through 1e and lot 2f is prepared by adding the p-quinondioxime and the diphenyl guanidine to the polyalkylene polysulfide prepolymer. Of the two controls, lot 2e will cure at room temperature or with only a moderate heat cure while lot 2f requires an extended heat cure.

|  | 2a | 2b | 2c | 2d | 2e | 2f |
|---|---|---|---|---|---|---|
| Compositions: |  |  |  |  |  |  |
| Polyalkylene polysulfide prepolymer ("Thiokol" liquid polymer LP-3) | 100 | 100 | 100 | 100 | 100 | 100 |
| N-N'-bis-ethylenisosebacamide | 34.3 | 34.3 |  |  |  |  |
| N,N'-bis-ethylenisophthalamide |  |  | 30.2 | 30.2 |  |  |
| Tri(dimethylaminomethyl) phenol | 1.3 | 1.3 | 1.3 | 1.3 |  |  |
| Lead dioxide |  |  |  |  | 30 |  |
| Dibutylphthalate |  |  |  |  | 27 |  |
| Stearic acid |  |  |  |  | 3 |  |
| p-Quinondioxime |  |  |  |  |  | 7 |
| Diphenylguanidine |  |  |  |  |  | 3 |
| Cure: |  |  |  |  |  |  |
| Ambient temperatures only (i.e. 70–75° F.) | X |  | X |  |  |  |
| Cure time at 160° F. (hours) |  | 2½ |  | 2½ | 2½ | 24 |

Appearance: Lots 2a, 2c and 2d are straw-colored and translucent, lot 2b is red and translucent, lot 2e is reddish-brown opaque and lot 2f is black and opaque.

The results of the tests performed on these rubbers are as follows:

|  | 2a | 2b | 2c | 2d | 2e | 2f |
|---|---|---|---|---|---|---|
| Tensile Properties: |  |  |  |  |  |  |
| Tensile strength, p.s.i. | 89 | 83 | 108 | 88 | 83 | 112 |
| Elongation, percent | 160 | 155 | 121 | 103 | 273 | 240 |
| Set at break, percent | 0 | 0 | 0 | 0 | 0 | 0 |
| Hardness: Shore A-2 | 32 to 37 | 28 to 32 | 30 to 35 | 32 to 37 | 25 to 30 | 20 to 35 |
| Low temperature flexibility: |  |  |  |  |  |  |
| Gehman T₁₀, °F | −44.5 | +28 | −46 | −28 | −56 | −45 |
| Scott brittleness, T₁₀, °F | −37 to −40 | −42 to −44 | −28 to −32 | −30 to −33 | −48 to −50 | −41 to −43 |
| Volume swelling in water (ASTM D 471-49T "B"): Immersed 70 hr. at 180° F., percent | 73.7 | 78.9 | 15.1 | 15.1 | 15.4 | 7.4 |
| Volume swelling in 70:30 isooctane:toluene fuel (Calculated according to the formula set out in example 1): Immersed 48 hr. at 180° F., percent |  | 19 | 15 | 13 | 34 | 23 |

|  | 2a | 2c | 2e | 2f |
|---|---|---|---|---|
| Adhesion Properties:[1] |  |  |  |  |
| To glass | 6C | 4A | 2A | 2A |
| To aluminum | 6C | 4–6A | 2A | 2A |
| To stainless steel | 6C | 6C | 2A | 2A |

[1] The test procedures of MIL-S-8802 (ASG) are used. The type of failure is designated as either adhesive (A) or cohesive (C).

|  | 2a | 2c | 2f |
|---|---|---|---|
| Resistance to aging at high temperature (High temperature aging 70 hr. at 250° F. in air): |  |  |  |
| Weight loss during cycling, percent | 7.96 | 6.78 | 3.27 |
| Hardness, Shore A-2: |  |  |  |
| Before aging | 40 to 45 | 35 to 40 | 40 to 45 |
| After aging | 40 to 45 | 40 to 45 | 30 to 35 |

The utility of lots 2a, 2b, 2c and 2d includes the sealing of the seams of metal tanks.

Lots 2g and 2h are examples of filled copolymers of the invention. They are prepared by mixing the polyalkylene polysulfide prepolymer and the bis-amide and adding the filler and the other ingredients.

|  | 2g | 2h |
|---|---|---|
| Compositions: |  |  |
| Polyalkylene polysulfide prepolymer ("Thiokol" liquid polymer LP-3) | 50 | 50 |
| N,N'-bis-ethylenisosebacamide | 50 | 50 |
| Titanium dioxide filler | 50 | 50 |
| p-Quinondioxime | 7 | 7 |
| Diphenylguanidine | 3 | 3 |
| Sulfur (powdered) |  | .1 |

The resulting mixtures are mobile liquids which cure in 20 hours at 160° F. to solids having the following properties:

|  | 2g | 2h |
|---|---|---|
| Tensile Properties: |  |  |
| Tensile strength, p.s.i. | 200 | 300 |
| Elongation, percent | 65 | 45 |
| Set at break, percent | 0 | 0 |
| Volume swelling (ASTM D 471-49T "B"): |  |  |
| 70:30 isooctane:toluene (48 hr. at 180° F.), percent | 0 | 0 |
| Water (70 hr. at 180° F.), percent | 0 | 0 |
| Water absorption, percent (Submerged at 70-75° F.): |  |  |
| 1 day | 2.42 | 1.73 |
| 7 days | 4.28 | 3.78 |
| 11 days | 4.85 | 4.15 |
| Hardness: Shore A-2 | 70–90 | 70–90 |

*Example 3*

In this example a polyalkylene polysulfide prepolymer which is a thiol-terminated liquid polymer of bis(ethylene oxy) methane having a viscosity at 25° C. of 350–450 poises, a number average molecular weight of 4,000 and a pour point of 45° F. (which is available from the Thiokol Corporation of Trenton, N.J., under the designation "Thiokol" liquid polymer LP-32) is reacted with two bis-amides to form rubbery solids.

The following lots are prepared by the methods of lots 1a through 1e.

|  | 3a | 3b | 3c | 3d | 3e |
|---|---|---|---|---|---|
| Compositions: |  |  |  |  |  |
| Polyalkylene polysulfide prepolymer ("Thiokol" liquid polymer LP-32) | 100 | 100 | 100 | 100 | 100 |
| N,N'-bis-ethylenisosebacamide | 8.6 | 8.6 |  |  |  |
| N,N'-bis-ethylenisophthalamide |  |  | 7.4 | 7.4 |  |
| Tri(dimethyl aminomethyl) phenol | 1.1 | 1.1 | 1.1 | 1.1 |  |
| Lead dioxide |  |  |  |  | 7.5 |
| Dibutylphthalate |  |  |  |  | 6.7 |
| Stearic acid |  |  |  |  | .8 |
| Cure: |  |  |  |  |  |
| Ambient temperatures only (i.e. 70-75° F.) | X |  | X |  |  |
| 2½ hr. at 160° F. |  | X |  | X | X |

Appearance: Lots 3a, 3c and 3d are straw-colored and translucent, lot 3b is red and translucent and lot 3e is reddish-brown and opaque.

The results of the tests performed on these rubbers are as follows:

|  | Lots | | | | |
| --- | --- | --- | --- | --- | --- |
|  | 3a | 3b | 3c | 3d | 3e |
| Tensile properties: | | | | | |
| Tensile strength, p.s.i. | 85 | 71 | 91 | 91 | 81 |
| Elongation, percent | 160 | 157 | 116 | 128 | 143 |
| Set at break, percent | 0 | 0 | 0 | 0 | 0 |
| Hardness: Shore A-2 | 28 to 33 | 25 to 30 | 38 to 43 | 35 to 40 | 33 to 38 |
| Low temperature flexibility: | | | | | |
| Gehman T₁₀, °F | −58 | −42 | −44 | −43 | −55 |
| Scott brittleness, T₅, °F | −40 to −44 | −42 to −46 | −38 to −41 | −40 to −44 | −45 to −48 |
| Volume swelling in water (ASTM D 471-49T "B"): Immersed 70 hr. at 180° F., percent | 49.3 | 27.0 | 22.8 | 31.3 | 7.4 |
| Volume swelling in 70:30 isooctane:toluene fuel (Calculated according to the formula set out in Example 1): Immersed 48 hr. at 180° F., percent | | 24 | 23 | 23 | 49 |
| Adhesion properties:¹ | | | | | |
| To glass | 4A | | 12C | | 2A |
| To aluminum | 7C | | 6C | | 2A |
| To stainless steel | 6C | | 13C | | 2A |

¹ The test procedures of MIL-S-8802(ASG) are used. The type of failure is designated as either adhesive (A) or cohesive (C).

In addition, lot 3a adheres so strongly to aluminum that it fails cohesively before being pulled away from the aluminum even after being immersed in either JP-4 fuel or a 3% solution of sodium chloride in water for 1 week at 140° F. Lot 3c fails cohesively before being pulled away from glass after being immersed for 1 week at 140° F. in JP-4 fuel.

|  | Lots | | | | |
| --- | --- | --- | --- | --- | --- |
|  | 3a | 3b | 3c | 3d | 3e |
| Resistance to aging at high temperature (High temperature aging 70 hr. at 250° F. in air): | | | | | |
| Weight loss during aging, percent | 13.13 | 10.66 | 15.13 | 16.87 | 14.59 |
| Hardness, Shore A-2: | | | | | |
| Before aging | 40 to 45 | 40 to 45 | 40 to 45 | 40 to 45 | 40 to 45 |
| After aging | 40 to 45 | 40 to 45 | 40 to 45 | 40 to 45 | 40 to 45 |

Lot 3f is another example of a filled copolymer of the invention. It is prepared by the method of lot 1m, the sulfur being mixed with the lead dioxide, dibutyl phthalate and stearic acid before mixing them with the other ingredients.

Composition: Lot 3f
Polyalkylene polysulfide prepolymer ("Thiokol" liquid polymer LP-32) ---- 50
N,N'-bis-ethylenisosebacamide ---- 50
Lead dioxide ---- 6.6
Dibutylphthalate ---- 5.9
Stearic acid ---- 1.6
Sulfur ---- .1
Carbon black filler ---- 30

It is a viscous mixture which is cured for 90 hours at 160° F. At the end of this cure a solid having a Shore A-2 hardness of 35–40 has formed.

Example 4

In this example a polyalkylene polysulfide prepolymer has been used which is a thiol-terminated liquid polymer of bis(ethylene oxy)methane having a viscosity at 25° C. of 13–15.5 poises, a number average molecular weight of 1,000 and a pour point of 5 to 10° F. (which is available from the Thiokol Corporation of Trenton, N.J., under the designation "Thiokol" liquid polymer LP-33).

The following lots are prepared by the methods of lots 2a, 2e and 2f respectively.

|  | Lots | | |
| --- | --- | --- | --- |
|  | 4a | 4b | 4c |
| Compositions: | | | |
| Polyalkylene polysulfide prepolymer ("Thiokol" liquid polymer LP-33) | 100 | 100 | 100 |
| N,N'-bis-ethylenisosebacamide | 36.3 | | |
| Tri(dimethyl aminomethyl) phenol | 1.4 | | |
| Lead dioxide | | 30 | |
| Dibutylphthalate | | 27 | |
| Stearic acid | | 3 | |
| p-Quinondioxime | | | 7 |
| Diphenylguanidine | | | 3 |
| Cure: Hours at 160° F. | 2½ | 2½ | 24 |

Appearance: Lot 4a is red and translucent, lot 4b is reddish-brown and opaque and lot 4c is black and opaque.

The results of the tests performed on these resins are as follows:

|  | Lots | | |
| --- | --- | --- | --- |
|  | 4a | 4b | 4c |
| Tensile properties: | | | |
| Tensile strength, p.s.i. | 123 | 76 | 132 |
| Elongation, percent | 120 | 310 | 890 |
| Set at break, percent | 0 | 0 | 0 |
| Hardness: Shore A-2 | 33 to 38 | 20 to 25 | 23 to 28 |
| Low temperature flexibility: | | | |
| Gehman T₁₀, °F | −47 | −54 | −52 |
| Scott brittleness, T₅, °F | −43 to −47 | −49 to −52 | −40 to −43 |
| Volume swelling in water (ASTM D 471-49T "B"): Immersed 70 hr. at 180° F., percent | 22.8 | 7.4 | 22.8 |
| Volume swelling in 70:30 isooctane:toluene fuel (Calculated according to the formula set out in Example 1): Immersed 48 hr. at 180° F., percent | 18 | 33 | 23 |
| Resistance to aging at high temperature (High temperature aging 70 hr. at 250° F. in air): | | | |
| Weight loss during aging, percent | 9.12 | | 3.85 |
| Hardness, Shore A-2: | | | |
| Before aging | 40–45 | | 35–40 |
| After aging | 40–45 | | 5–10 |

Lot 4d is another example of a filled copolymer of the invention. It is prepared by the method of lot 2h.

Composition: Lot 4d
Polyalkylene polysulfide prepolymer ("Thiokol" liquid polymer LP-33) ---- 50
N,N'-bis-ethylenisosebacamide ---- 50
Titanium dioxide filler ---- 50
p-Quinondioxime ---- 7
Diphenylguanidine ---- 3
Sulfur (powdered) ---- 1

The resulting mixture is a mobile liquid which cures in 20 hours at 160° F. to a solid having the following properties:

Tensile properties: Lot 4d
Tensile strength, p.s.i. ---- 280
Elongation, percent ---- 20
Set at break, percent ---- 0

Volume swelling (ASTM D 471-49T "B"):
70:30 isooctane:toluene (48 hr. at 180° F.), percent ---- 0
Water (70 hr. at 180° F.), percent ---- 7.4

Water absorption (submerged at 70–75° F.):
1 day ---- 2.42
7 days ---- 5.35
11 days ---- 6.9

Hardness: Shore A-2 ---- 70–90

Example 5

Five fast curing casting resins are prepared from a bisamide, a liquid epoxy resin which is a reaction product of epichlorohydrin and 2,2-bis (4-hydroxyphenyl)-propane having a Brookfield viscosity of 110–170 poises and an epoxide equivalent weight of 180–205 (which is available from the Bakelite Division of the Union Carbide and Carbon Corporation of New York 17, New York, under the designation ERL–2774), a polyalkylene polysulfide prepolymer (which is available from the Thiokol Corporation of Trenton, N.J., under the designation "Thiokol" liquid polymer LP–3), resorcinol and tri(dimethyl aminomethyl)phenol. The resins are prepared by mixing parts A (a mixture of the bis-amide, the epoxy resin and the resorcinol and B (a mixture of the polyalkylene polysulfide polymer and the catalyst). The resulting liquids cure to solid resins at ambient temperatures. By preheating the liquid resins, the curing rate may be accelerated so that tack-free solids are formed more quickly.

The compositions and cures of the various lots are given in the following table:

|  | Lots | | | | |
| --- | --- | --- | --- | --- | --- |
|  | 5a | 5b | 5c | 5d | 5e |
| Compositions: | | | | | |
| Part A— | | | | | |
| N,N'-bis-ethyleniso-sebacamide | | | | 15.75 | |
| N,N'-bis-ethylenesebacamide | 12.40 | 14.05 | 15.75 | | |
| N,N-bis-ethylen-isophtalamide | | | | | 17.00 |
| Epoxy Resin (Bakelite ERL–2774) | 37.40 | 42.25 | 47.25 | 47.25 | 52.70 |
| Resorcinol | .035 | 0.45 | 0.40 | 0.40 | 0.40 |
| Part B— | | | | | |
| Polyalkylene polysulfide prepolymer ("Thiokol" liquid polymer LP–3) | 43.70 | 37.00 | 31.50 | 31.50 | 23.5 |
| Tri(dimethyl aminomethyl)phenol | 6.15 | 5.65 | 5.10 | 5.10 | 5.8 |
| Cure characteristics: | | | | | |
| Gel time (minutes) | 20 | 7 | 16 | 20 | 15 |
| Initial temperature of mixture (° C.) | 25 | 55 | 55 | 25 | 25 |

The results of tests performed on these resins are as follows:

|  | Lots | | | | |
| --- | --- | --- | --- | --- | --- |
|  | 5a | 5b | 5c | 5d | 5e |
| Tensile strength (p.s.i.) (ASTM D 638–52T) | 405 | 2,300 | 5,180–5,070 | 2,700 | 1,700 |
| Elongation, percent (ASTM D 638–52T) | 15.2 | 96 | 19.5–29.5 | 10.8 | 1.0 |
| Modulus (tensile) (p.s.i. × 10$^{-4}$) (ASTM D 638–52T) | 38 | 62.5 | 195–168 | 107 | 201 |
| Flexural strength (p.s.i.) (ASTM D 790–49T) | 67 | 1,920 | 8,400 | 6,720 | 3,450 |
| Modulus (flex.) (p.s.i. × 10$^{-4}$) (ASTM D 790–49T) | 4.1 | 61.5 | 246 | 205 | 427 |
| Compressive strength (p.s.i.)[1] | | 57,200 | 39,300 | | |
| Compressive strain at failure (percent)[1] | | 93.0 | 61.0 | | |
| Compressive stress at yield (p.s.i.)[1] | | 2,000 | 10,000 | | |
| Compressive strain at yield (percent)[1] | | (yield) | 6.5 | | |
| Modulus (comp.) (p.s.i. × 10$^{-4}$)[1] | | 56.3 | 209 | | |
| Impact strength (ft. lb./inch) (ASTM D 256–54T) | 2.53 | 2.02 | 1.11 | 0.72 | 0.30 |
| Heat distortion temp. (° C.) (ASTM D 648–45T) | | 28 | 50 | 38 | 59 |
| Water absorption (percent) 24 hr. (ASTM D 570–54T) | 3.1 | 1.9 | 1.80 | 2.52 | 0.85 |

[1] ASTM D 695–54.

*Example 6*

About 33.2 parts of N,N'-bis propylenterephthalamide are melted and mixed into 100 parts of "Thiokol" liquid polymer LP–3 followed by 1.3 parts of tri(dimethyl aminomethyl) phenol catalyst. The mixture is heated for 24 hours at 120° C. and a soft, tacky, thixotropic material is formed.

In another lot, 9.3 parts of N,N'-bis propylenterephthalamide, 100 parts of "Thiokol" liquid polymer LP–2 and 1.1 parts of tri(dimethyl aminomethyl) phenol are mixed by the same method and heated 24 hours at 120° C. At the end of this time a soft, tacky, thixotropic material is formed.

Both of these materials are useful as sealers for pipe threads, particularly for use in lines which are carrying liquid hydrocarbon fuels. They are also useful as replaceable channel (or injection) sealers in aircraft, particularly for sealing hydrocarbon fuel storage spaces. It is usually possible to improve the properties of these materials for use as sealers by techniques of compounding, such as the addition of fillers, well known to those skilled in the art.

*Example 7*

About 33.2 parts of N,N'-bis propylenisophthalamide are mixed into 100 parts of "Thiokol" liquid polymer LP–3 followed by 1.3 parts of tri(dimethyl aminomethyl) phenol catalyst. The mixture is cured for 24 hours at 120° C. At the end of the cure, a soft, tack-free solid has formed.

In another lot 9.3 parts of N,N'-bis propylenisophthalamide, 100 parts of "Thiokol" liquid polymer LP–2 and 1.1 parts of tri(dimethyl aminomethyl) phenol are mixed by the same method and cured 24 hours at 120° C. At the end of the cure, a soft, tack-free solid has formed.

*Example 8*

About 100 parts (by weight) of "Thiokol" liquid polymer LP–2, and 10.7 parts of N,N'-bis ethylendodecanoyldicarboxylic acid amide are mixed thoroughly and 1.1 parts of tri(dimethyl aminomethyl)phenol are subsequently stirred in to yield a homogeneous mixture. A tough rubber is formed within 24 hours at room temperature.

*Example 9*

The preparations of five lots illustrating the compositions of the invention which contain relatively large amounts of bis-amides are given below. These lots are prepared by mixing the bis-amide (which in lots 9a, 9b and 9c has been heated until it is liquified) with the polyalkylene polysulfide prepolymer and then adding the catalyst.

|  | Lots | | | | |
| --- | --- | --- | --- | --- | --- |
|  | 9a | 9b | 9c | 9d | 9e |
| Compositions: | | | | | |
| Polyalkylene polysulfide prepolymer "Thiokol" liquid polymer LP–2 | 10 | | 50 | 50 | |
| "Thiokol" liquid polymer LP–32 | | 10 | | | 50 |
| Bis-amide: | | | | | |
| N,N'-bis-ethylenisosebacamide | | | | 50 | 50 |
| N,N'-bis-ethylenisophthalamide | 90 | 90 | 50 | | |
| Catalyst: | | | | | |
| Benzyl dimethyl amine | 1 | 1 | 1 | | |
| Tri(dimethyl aminomethyl) phenol | | | | 1 | 1 |
| Cure: Hours at 100° F | 3½ | 3½ | 3½ | 3½ | 3½ |

Appearance: All five lots are transparent and straw-colored, lots 9a, 9b and 9c are rigid and lots 9d and 9e are tough and rubbery.

|  | Lots | |
| --- | --- | --- |
|  | 9d | 9e |
| Tensile properties: | | |
| Tensile strength, p.s.i. | 254 | 235 |
| Elongation, percent | 60 | 60 |

*Example 10*

About 100 parts of N,N'-bis-ethylenisosebacamide are mixed into 100 parts of polyalkylene polysulfide prepolymer which is a liquid polymer of bis(butylene oxy) methane (available from the Thiokol Corporation of Trenton, New Jersey, under the designation "Thiokol" liquid polymer ZL-205) and 6.6 parts of tri (dimethyl aminomethyl) phenol are added subsequently. This mixture gels after 4 hours at room temperature. Test results obtained from samples cured at room temperature are as follows.

Tensile properties:
| | |
|---|---|
| Tensile strength, p.s.i. | 135 |
| Elongation, percent | 75 |
| Set at break percent | 0 |
| Tensile strength run at 400° F. after 15 minutes aging at 400° F., p.s.i. | 150 |
| Elongation at 400° F., percent | 65 |

Hardness:
| | |
|---|---|
| Shore A-2 | 50 |

Low temperature Flexibility:
| | |
|---|---|
| Gehman $T_{10}$, ° F. | +20.3 |

Volume swelling (ASTM 471-49T "B"):
| | |
|---|---|
| 70:30 isooctane: toluene (48 hr. at 180° F.) | 15.1 |
| Water (70 hr. at 180° F.) | 15.1 |

Water absorption, percent (submerged at 70:75° F.):
| | |
|---|---|
| 1 day | 21.4 |
| 7 days | 23.8 |
| 11 days | 22.6 |

*Example 11*

11.1 parts of N,N'-bis-butylenisosebacamide are mixed with 100 parts of "Thiokol" liquid polymer LP-2 to form a homogeneous pourable mixture. 6.67 parts of p-quinone dioxime, 0.5 part of diphenyl guanidine, and 0.2 part of sulfur are added and the mixture is cured at 160° F. for 3½ hours to produce a soft, rubbery solid.

Similarly, 9 parts of N,N'-bis-ethylenhexahydroisophthalamide (a white solid which may be prepared from hexahydroisophthaloyl chloride and ethylenimine by the process herein described for the preparation of bis-amides) are mixed with 100 parts of "Thiokol" liquid polymer LP-2 and 1.1 parts of tri(dimethyl aminomethyl)phenol catalyst are added subsequently. This mixture cures after 16 hours at room temperature into a clear, light green colored, soft, non-tacky rubbery material.

*Example 12*

10 parts of N,N'-bis-ethylenisosebacamide, 100 parts of "Thiokol" ST (a thiol-terminated crosslinkable polysulfide crude rubber which has a sulfur rank of 2.25), 60 parts of carbon black filler and 0.5 part of stearic acid are milled together on a rubber mill for about 2 hours without heating the rolls. A black crepe-like sheet is produced. On curing for 30 minutes at 287° F., a soft rubber is obtained which is suitable for oil resistant gasket applications.

*Example 13*

6.55 parts of N,N-dibutyl-N'N"-diethylene phosphoric triamide, 5.0 parts of "Thiokol" liquid polymer LP-3 and 1.0 part of tri(dimethyl aminomethyl)phenol catalyst are mixed together thoroughly. The mixture is allowed to remain at room temperature for 24 hours and is then given a heat cure of 2 hours at 160° F. and 24 hours at 212° F. At the end of this time the mixture has cured to a dark brown opaque rubbery material. This copolymer may be used as a protective coating for various substrates such as wood, metal, etc. as well as for a sealant.

*Example 14*

About 5.8 parts of hexyl-N,N'-diethylene phosphorodiamidate, 5.0 parts of "Thiokol" liquid polymer LP-3 and 1.0 part of tri(dimethyl aminomethyl)phenol catalyst are mixed thoroughly to form a reddish brown compatible solution. This solution is allowed to stand for 24 hours at room temperature and is heat cured for 2 hours at 160° F. to produce a soft, cherry red rubber-like material. The liquid solution may be coated onto various substrates, such as wood or metal and then cured in place to form a protective coating. It may also be used as a sealant.

*Example 15*

About 5.1 parts of butyl-N,N'-diethylene phosphorodiamidate, 5.0 parts of "Thiokol" liquid polymer LP-3 and 1.0 part of tri(dimethyl aminomethyl) phenol catalyst are mixed thoroughly to form a reddish brown solution. This solution is allowed to stand for 24 hours at room temperature and is then cured for 2 hours at 160° F. The resulting solid is a slightly tacky, tough, rubbery material suitable for use as a sealant.

*Example 16*

About 6.2 parts of butyl-N,N'-di-2-methylethylene phosphorodiamidate, 5.0 parts of "Thiokol" liquid polymer LP-3 and 1.0 part of tri(dimethyl aminomethyl)phenol catalyst are mixed thoroughly to produce a reddish brown solution. This solution is allowed to stand for approximately 16 hours at room temperature and is then heat cured for 2 hours at 160° F. and 24 hours at 212° F. At the end of the cure cycle, a soft, transparent, cherry red, tacky rubber-like material has been formed which may be used as a sealant for wood, metals, etc.

*Example 17*

About 7.2 parts of p-chlorophenyl-N,N'-di-2-methylethylene phosphoric diamide, 5.0 parts of "Thiokol" liquid polymer LP-3 and 1.0 part of tri(dimethyl aminomethyl) phenol catalyst are mixed thoroughly to form a reddish brown liquid solution. This solution is allowed to stand for 24 hours at room temperature and is then cured for 2 hours at 160° F. to form a slightly tacky, amber colored, flexible rubbery composition suitable for use as a sealant.

*Example 18*

About 4.38 parts of a 75 percent solution of N,N',N"-tris-ethylenephosphoric triamide in ethanol, 5.0 parts of "Thiokol" liquid polymer LP-3 and 1.0 part of tri(dimethyl aminomethyl) phenol catalyst are mixed thoroughly to produce a brown opaque solution. This solution is allowed to stand at room temperature for 24 hours and is then heat cured for 2 hours at 160° F. A relatively hard rubbery material is formed. The liquid material may be cured in place to form a protective coating on various substrates, such as wood, metal, etc.

*Example 19*

3.32 parts of N,N'-bis-2-methylethylene-1,3 benzene disulfonamide, 10.0 parts of "Thiokol" liquid polymer LP-3 and 0.42 part of tri(dimethyl aminomethyl) phenol catalyst are mixed thoroughly at room temperature to form a liquid which exhibits a significant amount of exotherm. Within 5 minutes after mixing the liquid is cured to a tack free, tough, brown rubbery material which forms a useful coating or sealant when cured in place.

*Example 20*

8.45 parts of N,N'-bis-1,2-ethylene[1,1-isopropylidenebis(p-phenyleneoxy) di-2-propanol]carbamate, 5.0 parts of "Thiokol" liquid polymer LP-3 and 1.0 part of tri-(dimethyl aminomethyl) phenol catalyst are mixed thoroughly at room temperature to form a light brown paste-like material which cures within ½ hour at room temperature to a hard opaque resin-like material. The past may be cured in place to form a protective coating.

*Example 21*

6.15 parts of N,N',N"-tris-2-ethylenetrimesamide, 5.0 parts of "Thiokol" liquid polymer LP-3 and 1.0 part of tri(dimethyl aminomethyl) phenol catalyst are mixed thoroughly at room temperature to form a clear, pourable yellow liquid which cures within ten minutes at room temperature to form a clear, tough, solid yellow resin. This material adheres strongly to glass and aluminum when cured in contact with these materials of construction.

*Example 22*

6.35 parts of hexamethylene N,N'-diethylene-urea, 5.0 parts of "Thiokol" liquid polymer LP-3 and 1.0 part of tri(dimethyl aminomethyl) phenol catalyst are mixed thoroughly at room temperature to form an opaque, pink colored, viscous paste which is allowed to stand overnight at room temperature and then heated for two hours at 160° F. to form a hard, rather brittle light brown resin. When the paste is applied to a substrate such as wood and then cured in place, a useful protective coating is formed.

*Example 23*

6.5 parts of toluylene-N,N'-diethylene urea, 5.0 parts of "Thiokol" liquid polymer LP-3 and 1.0 part of tri-(dimethyl aminomethyl) phenol catalyst are mixed thoroughly at room temperature to form a viscous, light yellow paste which is heated for two hours at 160° F. to form a hard, opaque, light brown resin. When cured in place on a substrate such as wood a useful protective coating is formed.

The terms and expressions which have been employed are used as terms of description and not of limitation, and it is not intended, in the use of such terms and expressions, to exclude any equivalents of the feature shown and described or portions thereof, but it is recognized that various modifications are possible within the scope of the invention claimed.

What is claimed is:

1. A reaction product of a polyalkylene polysulfide prepolymer which contains recurring disulfide linkages (—S—S—) and which is polyfunctional in terms of mercaptan groups and a polyfunctional aziridine ring-containing compound of the formula:

where Q is an *n*-valent radical, *n* is at least 2, N is linked to an atom having a valence from 4 to 5 and R' and R" are selected from the group consisting of hydrogen and an alkyl group, said Q having no active hydrogen atoms.

2. A reaction product according to claim 1 in which Q contains the group

3. A reaction product according to claim 1 in which Q contains the group

4. A reaction product according to claim 1 in which the polyalkylene polysulfide prepolymer is a thiol-terminated liquid polymer of bis(ethylene oxy) methane.

5. A reaction product according to claim 1 in which the polyalkylene polysulfide prepolymer is a thiol-terminated liquid polymer of bis(butylene oxy) methane.

6. A reaction product of a polyalkylene polysulfide prepolymer which contains recurring disulfide linkages (—S—S—) and which is polyfunctional in terms of mercaptan groups and a polyfunctional azirane ring-containing alkylenamide which is a derivative of a polycarboxylic acid, the carbonyl residue of each carboxylic group thereof being bonded directly to the nitrogen atom of an azirane ring.

7. A reaction product of a polyalkylene polysulfide prepolymer which contains recurring disulfide linkages (—S—S—) and which is polyfunctional in terms of mercaptan groups and a N,N',N'''-tris-1,2-alkylentrimesamide.

8. A reaction product of a polyalkylene polysulfide prepolymer which contains recurring disulfide linkages (—S—S—) and which is polyfunctional in terms of mercaptan groups with N,N'-bis-ethylenisosebacamide.

9. A reaction product of a polyalkylene polysulfide prepolymer which contains recurring disulfide linkages (—S—S—) and which is polyfunctional in terms of mercaptan groups with N,N'-bis-ethylenisophthalamide.

10. A reaction product of a polyalkylene polysulfide prepolymer which contains recurring disulfide linkages (—S—S—) and which is polyfunctional in terms of mercaptan groups with N,N'-bis-ethylensebacamide.

11. A reaction product of a polyalkylene polysulfide prepolymer which contains recurring disulfide linkages (—S—S—) and which is polyfunctional in terms of mercaptan groups with N,N'-bis-propylenterephthalamide.

12. A reaction product of a polyalkylene polysulfide prepolymer which contains recurring disulfide linkages (—S—S—) and which is polyfunctional in terms of mercapto groups with N,N'-bis-butylenisosebacamide.

13. A compounded rubber composition comprising in admixture a polyalkylene polysulfide prepolymer which contains recurring disulfide linkages (—S—S—) and which is polyfunctional in terms of mercaptan groups and a compound of the formula:

where Q is an *n*-valent radical, *n* is at least 2, N is linked to an atom having a valence from 4 to 5 and R' and R" are selected from the group consisting of hydrogen and an alkyl group, said Q having no active hydrogen atoms.

14. A sealant composition comprising a reaction product of from 5 to 95 percent of a polyalkylene polysulfide which contains recurring disulfide linkages (—S—S—) and is polyfunctional in terms of mercaptan groups, with from 95 to 5% of a compound of the formula:

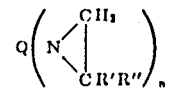

where Q is an *n*-valent radical, *n* is at least 2, N is linked to an atom having a valence from 4 to 5 and R' and R" are selected from the group consisting of hydrogen and an alkyl group, said Q having no active hydrogen atoms.

15. A surface coated with a cured product of a polyalkylene polysulfide prepolymer which contains recurring disulfide linkages (—S—S—) and which is polyfunctional in terms of mercaptan groups and a compound of the formula:

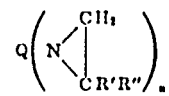

where Q is an *n*-valent radical, *n* is at least 2, N is linked to an atom having a valence from 4 to 5 and R' and R" are selected from the group consisting of hydrogen and an alkyl group, said Q having no active hydrogen atoms.

16. A reaction product of a polyalkylene polysulfide prepolymer which contains recurring disulfide linkages (—S—S—) and which is polyfunctional in terms of mercaptan groups and an N,N'-bis-1,2-alkylensulfonamide.

17. A reaction product of a polyalkylene polysulfide prepolymer which contains recurring disulfide linkages (—S—S—) and which is polyfunctional in terms of mercaptan groups and a bis-1,2-alkylene carbamate.

18. A reaction product of a polyalkylene polysulfide prepolymer which contains recurring disulfide linkages (—S—S—) and which is polyfunctional in terms of mercaptan groups and a bis-1,2-alkylene urea.

19. A reaction product of a polyalkalene polysulfide prepolymer which contains recurring disulfide linkages (—S—S—) and which is polyfunctional in terms of mercaptan groups and a bis-1,2-alkylenamide.

20. A polymeric composition comprising in admixture a polyalkylene polysulfide: N,N'-bis-1,2-alkylenamide reaction product and an epoxy resin, said polyalkylene polysulfide containing recurring disulfide linkages (—S—S—) and being polyfunctional in terms of mercaptan groups and said epoxy resin being a reaction product of epichlorohydrin and 2,2-bis(4-hydroxyphenyl)-propane.

References Cited in the file of this patent

UNITED STATES PATENTS 2,964,503   Carpenter _____ Dec. 13, 1960

UNITED STATES PATENT OFFICE
CERTIFICATE OF CORRECTION

Patent No. 3,119,782            January 28, 1964

Paul Fram

It is hereby certified that error appears in the above numbered patent requiring correction and that the said Letters Patent should read as corrected below.

Column 4, lines 29 and 30, for "phosphorodiamide" read -- phosphorodiamidate --; column 11, in the second table, under the heading "2f" lines 4 and 5, for "20 to 35." read -- 30 to 35. --; column 14, in the first table, under the heading "4c" line 1, for "109" read -- 100 --; column 15, last table, first column, line 20, for "20$^{-9}$" read -- 10$^{-9}$ --.

Signed and sealed this 19th day of January 1965.

(SEAL)
Attest:

ERNEST W. SWIDER            EDWARD J. BRENNER
Attesting Officer            Commissioner of Patents